June 26, 1956     A. F. SHIELDS     2,751,983

CUTTING KNIFE–EXTRA RANGE

Filed March 26, 1953

INVENTOR.
ALBERT F. SHIELDS
BY
Ostrolenk & Faber
ATTORNEYS

United States Patent Office 2,751,983
Patented June 26, 1956

2,751,983

CUTTING KNIFE—EXTRA RANGE

Albert F. Shields, Forest Hills, N. Y., assignor to S & S Corrugated Paper Machinery Co., Inc., Brooklyn, N. Y., a corporation of New York Application March 26, 1953, Serial No. 344,785

2 Claims. (Cl. 164—68)

The present invention relates to cutting mechanisms and in particular to a novel apparatus for severing continuously moving stock in which cutting occurs at a speed synchronous with the speed of the strip material.

In the manufacture of corrugated sheets, it is customary to cut the sheet material at predetermined lengths prior to stacking and further handling. Usually a continuously operating cyclic cutter, in the form of cooperating knives supported on individual drums, receives the strip or web of material and cuts the same into a series of standard sheets of predetermined length. For any given delivery speed to the cutter, the sheet length can be accurately adjusted by changing the period for each cycle or rotation of the cutter. That is, an increase in the cutter or knife speed results in shorter sheets, while a decrease in cutter or knife speed results in longer sheets.

During the cutting interval, it is essential that the cutter speed be substantially synchronous with the linear delivery speed of the sheet material to preclude bulging of the sheet material incident to the knives moving too slowly, or the equally troublesome problem of ripping of the sheets when the knives move too fast at the time of actual cutting.

Accordingly, it is broadly an object of the present invention to provide a novel cyclic cutter having mechanisms for rendering the delivery speed of the sheet material to be cut synchronous with the knife speed during the cutting interval.

Numerous cutting mechanisms have proven successful for securing synchronous movement of the knives in respect to the sheet material such as disclosed in United States Patents Nos. 2,149,822, 2,208,350, 2,202,872, 2,241,427, and 2,257,818, all assigned to the assignee of the present invention. In each of the aforesaid patents, the cutting knives are driven through variable speed drives having provision for control of the average speed or cutting cycle for production of individual sheets of selected lengths. These drives are further arranged to automatically increase the speed of rotation of the knives during the cutting interval so that irrespective of the average speed of rotation selected as a function of the desired sheet length, the knife speed is synchronous with the delivery speed when cutting. This obviates the above mentioned difficulties of bulging or ripping, but is limited in practice by the ability to periodically accelerate the knives to a speed substantially equal to the delivery speed for cutting.

The mechanical problems which may be encountered may be best appreciated by a practical illustration. A machine may be initially set up to cut sheets having a maximum length of 180", the sheet length being readily changed to any smaller dimension by a simple adjustment decreasing the period of the cyclic cutter. It is to be noted that the knife speed must be periodically rendered synchronous with the feed rate and if, for example, the periphery of the knife edge circle is 30", to allow for a 180" sheet length, it would be necessary to accelerate the knives at a ratio of approximately 6 to 1 as compared to the average speed during the non-cutting interval of the cycle. The disadvantages of such extreme cyclic speed variations are manifest, among them the exceptionally high stressing, loading, and vibration during cutting, which necessarily increases the risk of disarranging the interrelated driving mechanisms, wearing of the components, and the like.

Accordingly, it is a further object of the present invention to provide a cutter of the aforesaid character in which the knife delivery speeds are rendered synchronous during cutting without necessitating excessive variations of knife speed and the incident disadvantages.

In accordance with this aspect of the present invention, the variable speed drive periodically increases the knife speed during the cutting interval to a speed approaching the normal delivery speed, suitable provision being made along the delivery path of the strip material to the cyclic cutters for increasing the length of the delivery path in dependence upon the difference between the increased cutting speed and the normal delivery speed to render these speeds synchronous for cutting.

The above objects and further advantages and features of the present invention will become apparent upon consulting the following detailed description of the invention when taken in conjunction with the drawings wherein.

Figure 1:
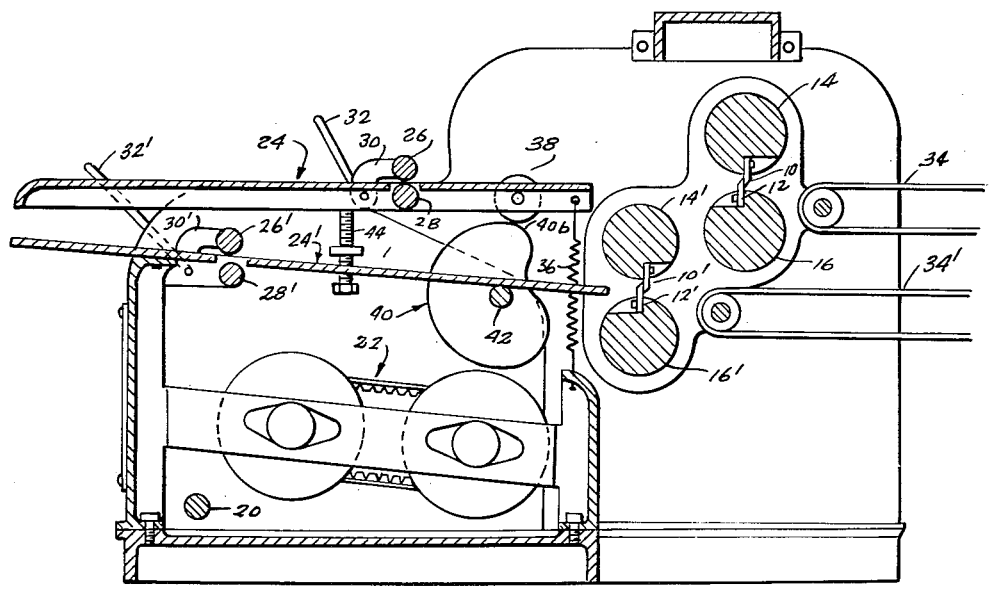
Figure 1 is a cross-sectional view of a cutting machine of the duplex type embodying features of the present invention.

Referring now to the drawings, there is shown a duplex cutting machine arranged to operate upon two separate continuous webs of material. This machine normally includes upper cooperating cutting knives 10, 12, mounted on superimposed drums 14, 16 which are driven by a suitable knife shaft 42. A duplicate set of lower cooperating cutting knives 10′, 12′ are carried on drums 14′, 16′, the duplicate set of knives 10′, 12′ being arranged forwardly of and below the knives 10, 12.

Figure 2:
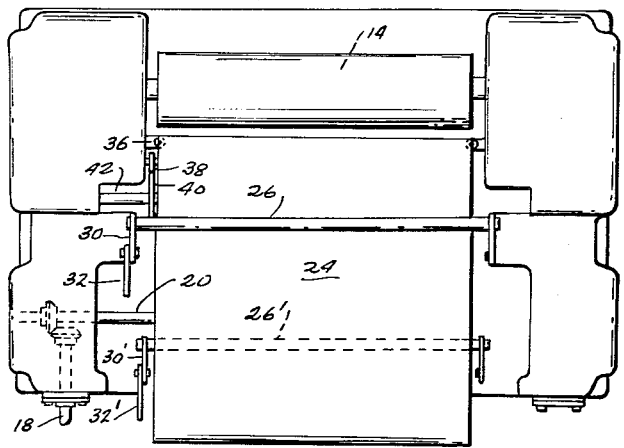
Figure 2 is a top plan view of the duplex cutting machine shown in Figure 1.

A single power source may be used for operation of both sets of cooperating cutting knives 10, 12 and 10′, 12′. As is seen in Figure 2, power may be transmitted from the main shaft 18 via suitable gearing to the driven shaft 20 which is operatively connected to an infinitely variable speed drive 22, such as a Reeves drive. For a detailed description of the variable speed drives, specific reference should be made to the above-mentioned patents wherein there is disclosed mechanisms for varying the adjustments of the cutting knives, for varying the adjustment of the Reeves drive, and for interrelating the adjustment of the Reeves drive and the cyclic adjustment of the cutting knives. These details are not shown in the present application since they are not necessary for complete understanding of the present disclosure, it being sufficient to point out for the present purposes that the Reeves drive or other variable speed drive is connected to and is part of a power chain operating the cutting knives. This power chain is so arranged that during each cycle the cutting knife has a linear velocity synchronous with the movement of the sheet material at the specific time cutting occurs. Other than this, the knife speed may be variable to change the period of the cutting cycle in accordance with the desired size of the sheets.

Arranged forwardly of the respective sets of cooperating knives 10, 12, 10′, 12′ are the feed tables 24, 24′ which are at levels selected in accordance with the location of the respective sets of knives. Associated with each of the feed tables 24, 24' are appropriate pairs of feed rollers 26, 28 and 26', 28' which guide the web material being fed to the respective sets of knives. The uppermost feed rollers 26, 26' of the respective pairs are mounted on bell cranks 30, 30' pivoted on the respective tables 24, 24' and allowing for pivotal movement of the uppermost rollers toward and away from the lowermost rollers 28, 28' in accordance with the thickness of the sheet material. Further, in order to permit threading of the web material between the respective feed rollers and toward the knives, the bell cranks are provided with handles 32, 32' for displacing the upper rollers 26, 26' away from the lower rollers 28, 28'.

Following the respective sets of cooperating knives are appropriate conveyor belts 34, 34' which receive the cut sheets for transportation toward suitable stacking and unloading stations.

The desired mechanisms, arranged in accordance with the teachings of the aforementioned patents, operate as follows:

One or both sets of the knives are continuously fed with web material via the respective feed tables 24, 24'. The period for the respective sets of cutting knives is selected in accordance with the desired sheet length, the variable speed drive optimally assuring a cutting speed synchronous with respect to the delivery speed during the cutting interval. The cut sheets are then conveyed by the belts 34, 34' to unloading stations at which the sheets are stacked. As previously pointed out, one of the main difficulties encountered, especially when cutting exceptionally long sheets, has been in periodically accelerating the knife speed to a value substantially equal to the delivery speed which is usually determined by mechanisms feeding the respective tables 24, 24'. In situations where long sheets are being cut, and as illustrated by the example previously set forth, the difficulty has been in periodically rendering the cutting speed approximately six or seven times the average cutting speed.

Accordingly, in accordance with the present invention the table 24 is arranged to periodically lengthen the feed or delivery path to the knives to thereby decrease the delivery speed from the normal value. The lengthening of the feed path is selected in dependence upon the difference between the increased knife speed during the cutting interval and the normal sheet speed, every attempt being made to have the knife speed approach the sheet speed within the practical limitations imposed by excessive strain, vibration, and the like. Optimally, and in situations where the knife speed can be made to approach the sheet speed by known mechanisms it is unnecessary to slow down the sheet speed. However, it has been found more feasible to render the critical speeds synchronous during cutting by the slowing down of the speed of material during this interval.

Figure 3:
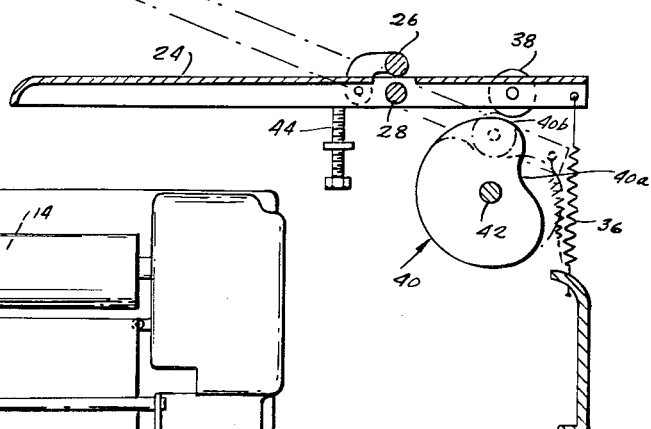
Figure 3 is a fragmentary section showing the tilting feed bed or table of the present invention in the inoperative or normal position coextensive with the feed path, the operative position of the bed or table being illustrated by the broken lines.

Specifically, the web material, which would bulge during cutting in the event that the knife speed was slower than the sheet speed, is provided with a controlled bulge or buckling by bending the board upwardly under the influence of the table 24. This table is tiltable and is mounted for rocking movement from the normal horizontal position of Figures 1 and 3 about the roller 28, serving as a pivot, to the inclined position illustrated by the broken lines of Figure 3.

Pivotally connected to the end of the table 24 adjacent the knives is a spring 36 which normally biases the table for swinging movement in a clockwise direction about the pivot 28. On the table 24 and interposed between the feed roller 28 and the point of connection of the spring 36 there is provided a cam follower 38 which is biased into contact with a cam 40 by the spring 36. The cam 40 is fixed to any suitable linkage or shaft of the variable speed drive for the knives 10, 12, for example, being secured to the knife shaft 42 forming part of the power chain for the knives. The development of the cam is selected to allow the spring 36 to urge the table 24 into a desired inclined position, illustrated by the broken lines of Figure 3, during the cutting interval. The dwell portion of the cam, designated by the reference numeral 40a, accurately predetermines the angular position of the table 24 which must be selected to properly increase the length of the delivery path to the knives. As previously stated, this increase is dependent upon the difference between the increased knife speed which may be practically obtained during the cutting interval and the sheet speed to this set of knives. As seen in Figure 1, the rise portion 40b of the cam, cooperating with the vertically adjustable stop member 44, assures accurate initial positioning of the feed table 24 along the feed path to the knives 10, 12.

Although only the upper table 24 has been illustrated as tiltable to periodically obtain a lengthened feed path for the associated set of knives, it is to be expressly understood that the lower table 24' may be arranged in accordance with the teachings outlined and coordinated with the drive for the lower set of knives 10', 12'. However, as a practical matter the necessity of having both sets of knives of the duplex cutter provided with the tilting table will usually not occur since relatively long sheets would not usually be of narrow width and accordingly would not be cut by duplex operation.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a mechanism for cutting continuously moving sheet material, a cyclic rotary cutter, means for feeding said sheet material at a normal sheet speed along a predetermined path to said cutter, a variable speed drive operatively connected to said cutter for driving said cutter at variable speeds throughout the cycle and at an increased speed during cutting of said sheet material, and means arranged along said path for increasing the length of said path during cutting of said strip material in accordance with the difference between the increased cutting speed and said normal sheet speed to render said speeds synchronous during cutting, said means including a tilting bed supporting said sheet material during movement along said path, a first guide roller disposed below said tilting bed and protruding thereinto so as to be contiguous to the undersurface of a sheet passing over said bed, a second guide roller mounted on said tilting bed and disposed above the first guide roller, said guide rollers cooperating to guide the sheet to the cutter at any tilted position of the bed, said bed being tiltable about the axis of said first guide roller and actuating means controlled by said cutter driving means for periodically tilting said bed into a predetermined angular position relative to said sheet path.

2. In a mechanism for cutting continuously moving sheet material, a cyclic rotary cutter, means for feeding said sheet material at a normal sheet speed along a predetermined path to said cutter, a variable speed drive operatively connected to said cutter for driving said cutter at variable speeds throughout the cycle and at an increased speed during cutting of said strip material, and means arranged along said sheet path for increasing the length of said path during cutting of said sheet material in accordance with the difference between the increased cutting speed and said normal sheet speed to render said speeds synchronous, said means including a tilting bed mounted for rocking movement about a horizontal axis and supporting said sheet material during movement along said sheet path, spring means normally biasing said tilting bed into a common plane with said predetermined sheet path, a first guide roller disposed below said tilting bed and protruding thereinto so as to be contiguous to the undersurface of a sheet passing over said bed, a second guide roller mounted on said tilting bed and disposed above the first guide roller, said guide rollers cooperating to guide the sheet to the cutter at any tilted position of the bed, said bed being tiltable about the axis of said first guide roller and actuating means controlled by said cutter driving means for periodically tilting said bed into a predetermined angular position relative to said sheet path.

References Cited in the file of this patent

UNITED STATES PATENTS

| | | |
|---|---|---|
| 35,592 | Dougherty | June 17, 1862 |
| 501,603 | Honiss | July 18, 1893 |
| 2,202,872 | Shields | June 4, 1940 |
| 2,257,818 | Shields | Oct. 7, 1941 |
| 2,315,976 | Method | Apr. 6, 1943 |

FOREIGN PATENTS

| | | |
|---|---|---|
| 470,357 | Germany | Jan. 11, 1929 |